US 8,225,822 B2
Jul. 24, 2012

(12) United States Patent
Erben et al.

(54) ELECTRIC FUELING SYSTEM FOR A VEHICLE THAT REQUIRES A METERED AMOUNT OF FUEL

(75) Inventors: Erik M Erben, Rio Rancho, NM (US); Janet Trujillo, Albuquerque, NM (US); Jonathan M Wong, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 901 days.

(21) Appl. No.: 12/271,527

(22) Filed: Nov. 14, 2008

(65) Prior Publication Data

US 2010/0122750 A1    May 20, 2010

(51) Int. Cl.
- *B65B 3/04* (2006.01)
- *B65B 31/00* (2006.01)
- *B64D 37/00* (2006.01)

(52) U.S. Cl. ............ 141/7; 141/1; 141/59; 141/98; 141/198; 244/135 R

(58) Field of Classification Search .......... 141/1, 7, 141/59, 66, 83, 95, 197, 198, 155, 98; 244/135 A, 244/135 R, 135 B
See application file for complete search history.

(56) References Cited

U.S. PATENT DOCUMENTS

| | | | |
|---|---|---|---|
| 1,867,602 A * | 7/1932 | Stukenborg | 137/234.6 |
| 3,692,212 A | 9/1972 | Irie et al. | |
| 3,805,857 A | 4/1974 | Johnson et al. | |
| 4,522,237 A * | 6/1985 | Endo et al. | 141/95 |
| 5,033,646 A | 7/1991 | McCann et al. | |
| 5,117,876 A | 6/1992 | Kuntz | |
| 5,150,857 A | 9/1992 | Moffitt et al. | |
| 5,152,478 A | 10/1992 | Cycon et al. | |
| 5,295,643 A | 3/1994 | Ebbert et al. | |
| 5,575,438 A | 11/1996 | McGonigle et al. | |
| 5,582,366 A | 12/1996 | Hamant et al. | |
| 5,695,153 A | 12/1997 | Britton et al. | |
| 6,035,903 A * | 3/2000 | Few et al. | 141/98 |
| 6,450,445 B1 | 9/2002 | Moller | |
| 6,604,706 B1 | 8/2003 | Bostan | |
| 6,691,949 B2 | 2/2004 | Plump et al. | |
| 6,721,646 B2 | 4/2004 | Carroll | |
| 6,860,300 B1 * | 3/2005 | Kuntz | 141/65 |

(Continued)

FOREIGN PATENT DOCUMENTS

EP    1767453 A1    3/2007

(Continued)

*Primary Examiner* — Timothy L Maust
*Assistant Examiner* — Timothy Kelly
(74) *Attorney, Agent, or Firm* — Shumaker & Sieffert, P.A.

(57) ABSTRACT

An electric fueling system for a vehicle that requires a metered amount of fuel comprising: a control box comprising a plurality of switches, a battery, a controller circuit card assembly, and a plurality of light emitting diodes; a flow meter coupled to the control box and to a vehicle; a pump coupled to the flow meter, to the control box, and to a fuel canister; and a housing that contains the control box, flow meter, and pump. The controller circuit card assembly has control logic such that the controller circuit card assembly manages the functions of setting the fuel level, de-fueling the vehicle, fueling the vehicle, and changing the brightness of the light emitting diodes, wherein the control logic receives inputs from the plurality of switches, the flow meter, the battery, and the pump and provides outputs to the plurality of light emitting diodes and the pump.

19 Claims, 7 Drawing Sheets

U.S. PATENT DOCUMENTS

| | | | |
|---|---|---|---|
| 7,013,930 B2 * | 3/2006 | Mann | 141/1 |
| 7,032,861 B2 | 4/2006 | Sanders, Jr. et al. | |
| 7,044,422 B2 | 5/2006 | Bostan | |
| 7,249,732 B2 | 7/2007 | Sanders, Jr. et al. | |
| 7,270,907 B2 | 9/2007 | Becerra et al. | |
| 7,487,672 B2 * | 2/2009 | Tatsuno | 73/149 |
| 2004/0094662 A1 | 5/2004 | Sanders, Jr. et al. | |
| 2004/0129828 A1 | 7/2004 | Bostan | |
| 2005/0082421 A1 | 4/2005 | Perlo et al. | |
| 2005/0252573 A1 * | 11/2005 | Montani | 141/98 |
| 2006/0049304 A1 | 3/2006 | Sanders, Jr. et al. | |
| 2006/0192047 A1 | 8/2006 | Goossen | |
| 2006/0231675 A1 | 10/2006 | Bostan | |
| 2007/0034738 A1 | 2/2007 | Sanders, Jr. et al. | |
| 2007/0051848 A1 | 3/2007 | Mantych et al. | |
| 2007/0119859 A1 | 5/2007 | Harrell | |
| 2007/0193650 A1 | 8/2007 | Eannati | |
| 2007/0221790 A1 | 9/2007 | Goossen | |
| 2007/0228214 A1 | 10/2007 | Horak | |
| 2007/0244608 A1 | 10/2007 | Rath et al. | |
| 2007/0262195 A1 | 11/2007 | Bulaga et al. | |
| 2007/0278248 A1 | 12/2007 | Van Vliet | |
| 2007/0295298 A1 | 12/2007 | Mark | |

FOREIGN PATENT DOCUMENTS

| | | |
|---|---|---|
| EP | 1767453 B1 | 6/2008 |
| WO | 0015497 | 3/2000 |
| WO | 2004002821 | 1/2004 |

* cited by examiner

ELECTRIC FUELING SYSTEM FOR A VEHICLE THAT REQUIRES A METERED AMOUNT OF FUEL

GOVERNMENT RIGHTS

The United States government may have certain rights in this invention pursuant to Government Contract # N41756-06-C-5617 with the U.S. Navy.

BACKGROUND OF THE INVENTION

A Ducted Fan Vertical Take Off and Landing Unmanned Aerial Vehicle (UAV) is an aircraft utilized primarily for reconnaissance and surveillance by the U.S. military. The UAV typically is gasoline powered and employs a bladder-like fuel tank to store fuel on board. The bladder collapses during flight when fuel is drawn by the gasoline engine to ensure a consistent flow of gasoline to the engine regardless of the roll, pitch, or yaw of the air vehicle. The bladder requires that all air and residual fuel be evacuated prior to refueling to minimize the air and maximize the fuel volume. The UAV system employs a manual process which includes a syringe-like device to de-fuel and refuel the bladder of the UAV. The manual fueling process, however, is operator intensive and prone to errors. For example, the manual fueling method takes a significant amount of time, multiple repetitive steps and operator diligence to effectively and correctly fuel the UAV.

The process for fueling is to first remove all air and residual fuel by evacuating the flexible bladder. Evacuation of the bladder using a manual syringe requires (1) closing the clip of the syringe leading to the fuel canister and opening the clip leading to the aerial vehicle, (2) extracting residual fuel and air into the syringe, (3) closing the clip to the aerial vehicle and reopening the clip leading to the fuel canister, (4) pushing excess fuel and air into the fuel canister, and (5) repeating steps 1-4 until all fuel and air is extracted from the aerial vehicle. The bladder is then re-filled with a measured quantity of fuel. This is accomplished by (1) using the syringe to extract a measured amount of fuel from the fuel canister, (2) pushing excess air in the syringe back into the fuel canister before pushing fuel into the aerial vehicle, (3) closing the clip leading to the fuel canister and opening the clip leading to the aerial vehicle, (4) pushing fuel from the syringe into the aerial vehicle, (5) repeating steps 1-4 four more times, and (6) detaching the fuel line from the syringe to the aerial vehicle. Both the removal of air/residual fuel and the quantity of fuel delivered by the fueling process are critical. If either task is not properly performed this may result in a loss of the UAV during operation.

SUMMARY OF THE INVENTION

Outlined herein is an electric fueling system and a method for implementing the same on an unmanned aerial vehicle or any other vehicle that requires a metered amount of fuel. The present invention has the beneficial effects of reducing the amount of time to de-fuel and refuel and greatly reducing the potential for operator error.

In a first aspect, as shown in FIG. 1, the present invention provides an electric fueling system for a vehicle that requires a metered amount of fuel comprising: (a) a control box comprising a plurality of switches, a battery, a controller circuit card assembly, and a plurality of light emitting diodes, (b) a flow meter coupled to the control box and to a vehicle, (c) a pump coupled to the flow meter, to the control box, and to a fuel canister, and (d) a housing that contains the control box, flow meter, and pump.

In a second aspect, the present invention provides a method for fueling a ducted fan unmanned aerial vehicle using an electric fueling system comprising: (a) equalizing static electricity between the vehicle and the ground, (b) attaching a first fuel line from the electric fueling system to a fuel canister, wherein the electric fueling system comprises (i) a control box comprising a plurality of switches, a battery, a controller circuit card assembly, and a plurality of light emitting diodes, (ii) a flow meter coupled to the control box and to an unmanned aerial vehicle, (iii) a pump coupled to the flow meter, to the control box, and to the fuel canister, and (iv) a housing that contains the control box, flow meter, and pump, wherein the plurality of switches include a SET FUEL switch, DE-FUEL switch, FUEL switch, and DAY/NIGHT toggle switch, (c) attaching a second fuel line from the electric fueling system to the unmanned aerial vehicle, (d) applying power to the electric fueling system, (e) setting the fuel level, if necessary, via a SET FUEL switch, (f) de-fueling the unmanned aerial vehicle, (g) fueling the unmanned aerial vehicle, and (h) in response to a stop condition being indicated on one of the plurality of light emitting diodes, disconnecting the electric fueling system from the unmanned aerial vehicle and from the fuel canister.

In a third aspect, the present invention provides a method for de-fueling a ducted fan unmanned aerial vehicle using an electric fueling system that comprises: (a) equalizing static electricity between the vehicle and the ground, (b) attaching a first fuel line from the electric fueling system to a fuel canister, wherein the electric fueling system comprises (i) a control box comprising a plurality of switches, a battery, a controller circuit card assembly, and a plurality of light emitting diodes, (ii) a flow meter coupled to the control box and to an unmanned aerial vehicle, (iii) a pump coupled to the flow meter, to the control box, and to the fuel canister, and (iv) a housing that contains the control box, flow meter, and pump, wherein the plurality of switches include a SET FUEL switch, DE-FUEL switch, FUEL switch, and DAY/NIGHT toggle switch, (c) attaching a second fuel line from the electric fueling system to the unmanned aerial vehicle, (d) applying power to the electric fueling system, (e) de-fueling the unmanned aerial vehicle, and (f) in response to a stop condition being indicated on one of the plurality of light emitting diodes, disconnecting the electric fueling system from the unmanned aerial vehicle and from the fuel canister.

DETAILED DESCRIPTION OF THE PREFERRED EMBODIMENT

Figure 1:
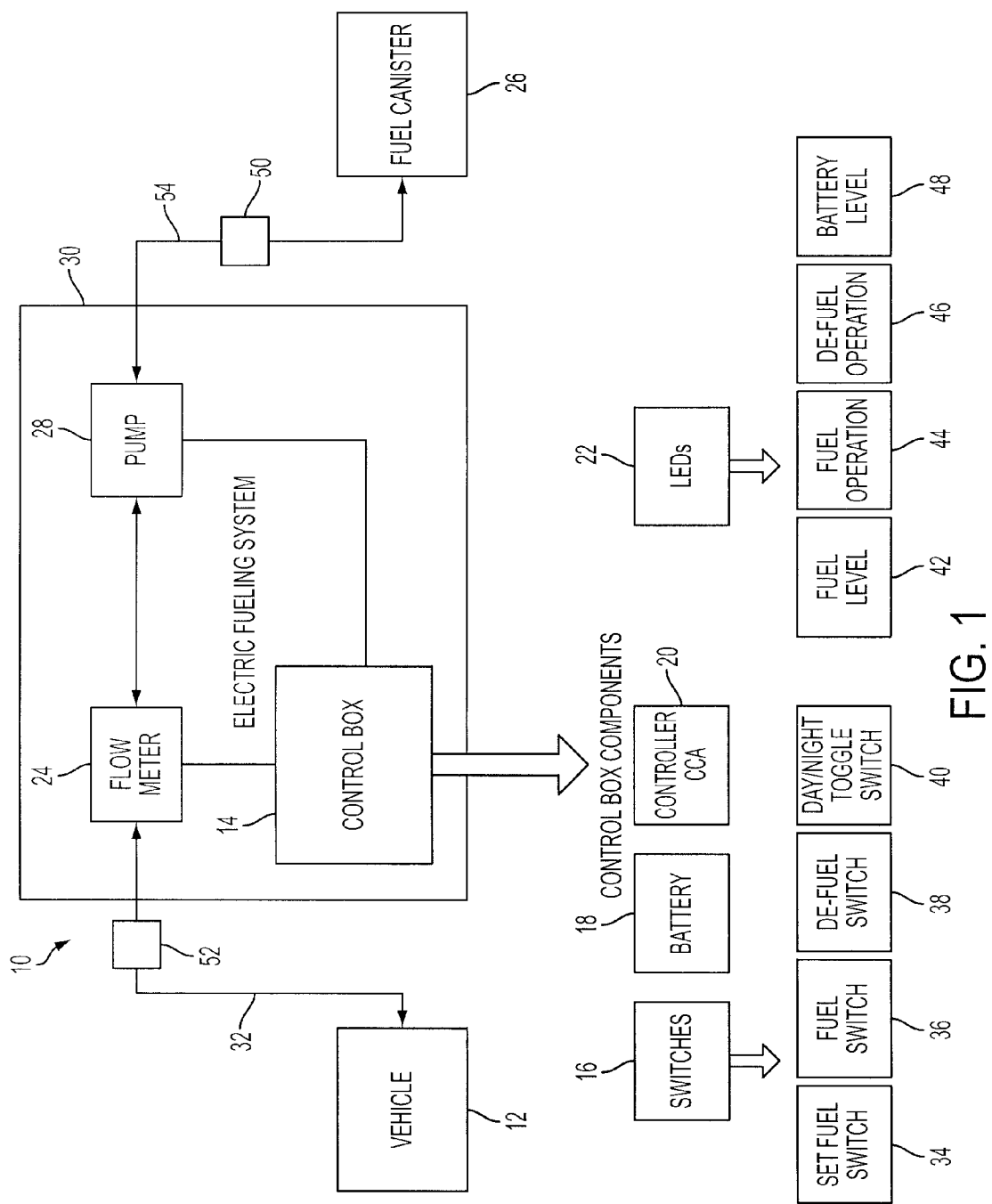
FIG. 1 illustrates the components of the electric fueling system.
Figure 2:
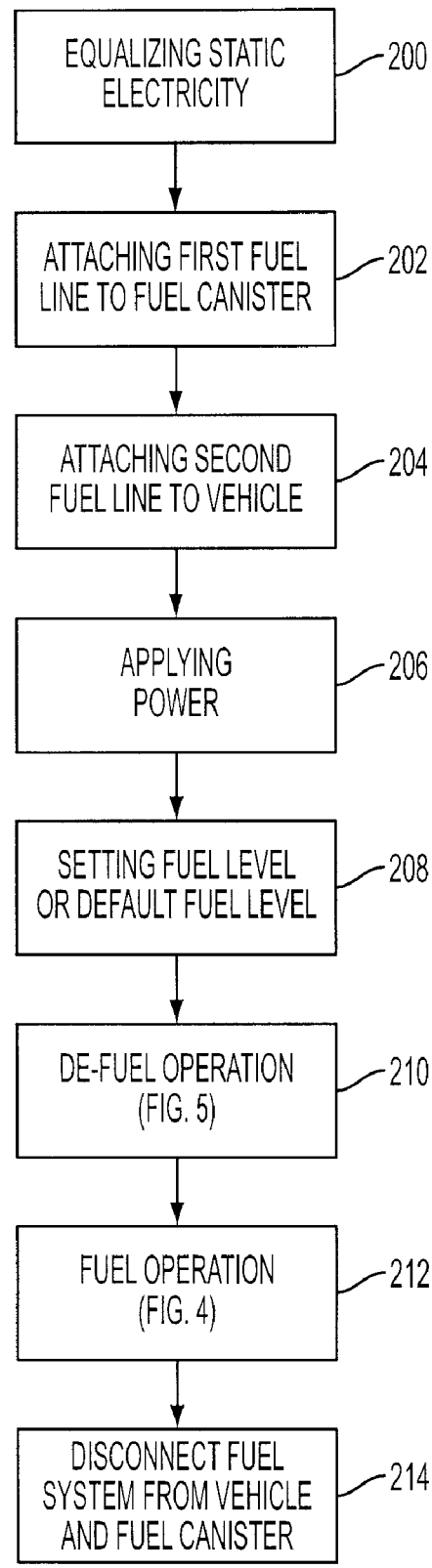
FIG. 2 is a flow chart of the method for fueling a ducted fan unmanned aerial vehicle using an electric fueling system.

In a first aspect, the present invention provides an electric fueling system 10 for a vehicle 12 that requires a metered amount of fuel comprising: (a) a control box 14 comprising a plurality of switches 16, a battery 18, a controller circuit card assembly 20, and a plurality of light emitting diodes 22, (b) a flow meter 24 coupled to the control box 14 and to a vehicle 12, (c) a pump 28 coupled to the flow meter 24, to the control box 14, and to a fuel canister 26, and (d) a housing 30 that contains the control box 14, flow meter 24, and pump 28.

As used herein, the control box 14 is a smaller enclosure that is sealed to prevent any fuel or water from splashing onto the internal electronic components. The pump 28 and flow meter 24 are similarly sealed as well.

As used herein, the flow meter 24 is any type of flow meter 24 known in the art. The electric fueling system 10 receives user input regarding the desired fuel level via one of the plurality of switches 16 on the control box 14. The flow meter 24 then measures the amount of fuel delivered to the vehicle 12 during the fueling operation to ensure the proper fuel level is obtained. Using the flow meter the controller circuit card assembly 20 detects any problems with the fueling process, for example, leaks in the fuel system 10 or too little fuel in the fuel canister 26 during refuel. If a problem is detected, the controller circuit card assembly 20 activates an emergency stop condition within the fueling system 10.

As used herein, the pump 28 is any type of reversible pump known in the art. The pump 28 is capable of de-fueling and removing existing air from the vehicle 12 without cavitation. The 28 pump also refuels without introducing air or vapor into the fueling system 10.

As used herein, the battery 18 is preferably a Lithium Polymer (LiPo) type rechargeable battery, but any type of battery known in the art may be employed.

As used herein, the housing 30 is a standard Pelican™ case compliant with the NEMA Type 4 standard known in the art. For example, the housing 30 is an enclosure constructed for either indoor or outdoor use to provide a degree of protection against falling dirt, rain, sleet, snow, windblown dust, splashing water, and hose-directed water and that will be undamaged by the external formation of ice on the enclosure. The top of the housing 30 opens to grant the user access to the control box 14.

As used herein, the fuel canister 26 is the receptacle for the fuel removed during the de-fueling process and also supplies the fuel for refueling. So the fuel canister 26 must be large enough to accommodate all the unused fuel in the vehicle's fuel tank in addition to the amount of fuel necessary to refuel the vehicle 12. During the de-fueling process, the unused fuel and any air or vapor generated in the vehicle's fuel tank is evacuated into the fuel canister 26 by a fuel line 32 extending to the bottom of the canister. By depositing the fuel at the bottom of the canister 26, any air or vapor rises to the surface of the fuel and is purged via a vent in the top of the canister 26. During the refueling process, the fuel is similarly drawn from the bottom of the canister, preventing reintroduction of any air into the vehicle's fuel tank.

In one embodiment, the plurality of switches includes 16 a SET FUEL switch 34, a FUEL switch 36, a DE-FUEL switch 38, and a DAY/NIGHT toggle switch 40. As used herein, the plurality of switches 16 is the user interface to provide input into the fueling system 10. The SET FUEL switch 34 allows the user to control the amount of fuel to be dispersed into the vehicle 12 during the fueling operation 400. The default fuel level is 100%. Each time the SET FUEL switch 34 is pressed, the fuel level advances in 20% increments. For example, pressing the SET FUEL switch 34 once moves the fuel level from 100% to 80%, pressing it 34 again advances the fuel level from 80% to 60% and so on until the fuel level is at 20% at which point pressing the SET FUEL switch 34 will reset the fuel level to 100%. The FUEL switch 36 allows the user to activate the fuel operation 400, which requires both a de-fuel and a refuel. The DE-FUEL switch 38 allows the user to activate the de-fuel operation 500 only, for example, when the vehicle 12 is being prepared for storage. The DAY/NIGHT toggle switch 40 controls the brightness of the plurality of light emitting diodes 22, such that the DAY mode is brighter than the NIGHT mode. Preferably, the DAY mode makes the plurality of light emitting diodes 22 bright enough to be viewed in glaring sunlight, whereas the NIGHT mode makes the plurality of light emitting diodes 22 very dim so as not to give-away a tactical position but still bright enough that an operator with night-adjusted vision can view them.

In one embodiment, the plurality of light emitting diodes 22 includes a ten segment array of light emitting diodes to indicate FUEL LEVEL 42, a light emitting diode to indicate whether the FUEL switch is activated 44, a light emitting diode to indicate whether the DE-FUEL switch is activated 46, and a three segment array of light emitting diodes to indicate battery level 48.

As used herein, the ten segment array of light emitting diodes (LEDs) 42 indicates the current fuel level during the fueling operation in 10% increments beginning with 10% and ending with 100%. For example, if the fuel level is set to 80%, the 80% LED lights up and remains solid. Then the fuel button is pressed. After defueling is completed, the fueling process begins and the "10%" LED begins to blink. When 11% of a fuel load is delivered, the "10%" LED remains lit but stops blinking and the "20%" LED begins to blink. When the fuel level is 21%, the "20%" LED remains lit but stops blinking and the 30% LED begins to blink and so on until the set fuel level is reached. This gives the operator feedback on the progress. Alternatively, only the LED corresponding to the current fuel level is lit and blinking.

As used herein, the three segment array of LEDs indicating battery level 48 informs the user whether the battery power is high (green), medium (amber), or low (red).

As used herein, for the fuel operation 400, the FUEL LED 44 is on and the DE-FUEL LED 46 blinks, indicating that de-fueling is occurring. Upon completion of the de-fuel operation 500, the DE-FUEL LED 46 is off and the FUEL LED 44 blinks. Upon completion of the fuel operation 400, the FUEL LED 44 is turned off. For the de-fuel operation 500, only the DE-FUEL LED 46 is on and blinking and, again, turns off upon completion of the de-fuel operation 500.

In one embodiment, the controller circuit card assembly 20 has control logic such that the controller circuit card assembly 20 manages the functions of setting the fuel level, de-fueling the vehicle 12, fueling the vehicle 12, and changing brightness of the light emitting diodes 22, wherein the control logic receives inputs from the plurality of switches 16, the flow meter 24, and the battery 18 and provides outputs to the plurality of light emitting diodes 22 and the pump 28.

In one embodiment, the electric fueling system 10 further comprises a filter 50 placed inline between the pump 28 and the fuel canister 26 and a header tank 52 placed inline between the flow meter 24 and the vehicle 12. The filter 50 is provided to remove contaminants between the fuel canister 26 and fuel tank of the vehicle 12, while the header tank 52 removes air bubbles from the fuel system 10 before they can reach the vehicle's fuel tank.

In one embodiment, the electric fueling system 10 is for a vehicle 12 which is an unmanned aerial vehicle. Due to the nature of the missions in which unmanned aerial vehicles 12 are often deployed, there is a need to refuel in remote locations in a short amount of time. Furthermore, unmanned aerial vehicles 12 must be de-fueled prior to every refueling to ensure air and vapor is completely evacuated from the fuel tank. These attributes make the electric fueling system 10 of the present invention uniquely compatible for use with an unmanned aerial vehicle 12, though use with other vehicles is contemplated.

As used herein, all the foregoing descriptions and embodiments with respect to the apparatus aspect are equally applicable to the following method aspects as well. Furthermore, all embodiments disclosed for each aspect may be combined with other embodiments.

In a second aspect, the present invention provides a method for fueling a ducted fan unmanned aerial vehicle 12 using an electric fueling system 10 comprising: (a) equalizing static electricity between the vehicle and the ground 200, (b) attaching a first fuel line 54 from the electric fueling system 10 to a fuel canister 26, 202, wherein the electric fueling system 10 comprises (i) a control box 14 comprising a plurality of switches 16, a battery 18, a controller circuit card assembly 20, and a plurality of light emitting diodes 22, (ii) a flow meter 24 coupled to the control box 14 and to an unmanned aerial vehicle 12, (iii) a pump 28 coupled to the flow meter 24, to the control box 14, and to the fuel canister 26, and (iv) a housing 30 that contains the control box 14, flow meter 24, and pump 28, wherein the plurality of switches 16 include a SET FUEL switch 34, DE-FUEL switch 38, FUEL switch 36, and DAY/NIGHT toggle switch 40, (c) attaching a second fuel line 32 from the electric fueling system 10 to the unmanned aerial vehicle 12, 204, (d) applying power to the electric fueling system 206, (e) setting the fuel level 208, if necessary, via a SET FUEL switch 34, (f) de-fueling the unmanned aerial vehicle 210, (g) fueling the unmanned aerial vehicle 212, and (h) in response to a stop condition being indicated on one of the plurality of light emitting diodes 22, disconnecting the electric fueling system 10 from the unmanned aerial vehicle 12 and from the fuel canister 26, 214.

As used herein, equalizing static electricity 200 is accomplished by placing an operator's hand on a duct of the ducted fan unmanned aerial vehicle 12. Alternatively, static electricity could be equalized 200 by other methods known in the art such as using a grounding stake and wire that is connected to a leg of the vehicle 12. However, since the vehicle 12 is generally on the ground at this step in the method and a properly grounded stake is not usually available, the potential static discharge, which could create a spark, is preferably mitigated by placing a hand on the duct.

As used herein, one end of the first fuel line 54 is preferably affixed to the pump 28 of the fueling system 10. The other end of the first fuel line 54 is preferably manually connected 202 by the operator to the fuel canister 26 via a custom fuel coupler on the fuel canister 26 to adapt to the fueling system 10.

As used herein, one end of the second fuel line 32 is preferably affixed to the flow meter 24 of the fueling system 10. The other end of the second fuel line 32 is preferably manually connected 204 by the operator to the unmanned aerial vehicle 12 via a connector that allows access to the vehicle's fuel tank without introducing air into the fueling system 10. These connectors are normally closed and only open upon being mated with a corresponding connector in a male-female relationship.

As used herein, applying power 206 is accomplished by activating a power switch on the control box 14 enabling the electric fueling system 10 to draw power from the battery 18. In operation, the fueling system 10 draws approximately 20 watts of power.

As used herein, setting the fuel level 208 requires an assessment by the operator of the proper amount of fuel based upon the particular vehicle's configuration, the anticipated length of the mission, and take-off conditions, such as temperature and ground elevation. The operator sets the fuel level 208 by pressing the SET FUEL switch 34 until the set fuel level is advanced in 20% increments to the appropriate percentage. If the SET FUEL switch 34 is not activated, then the fueling system 10 defaults to a refuel amount of 100%.

De-fueling the unmanned aerial vehicle 12 is an operation that must always occur prior to refueling because the amount of fuel in the unmanned aerial vehicle 12 prior to the fuel operation 212 is not measured by the fueling system 10.

As used herein, a standard stop condition is indicated when both the DE-FUEL and FUEL LEDs 46, 44 are turned off.

Figure 3:
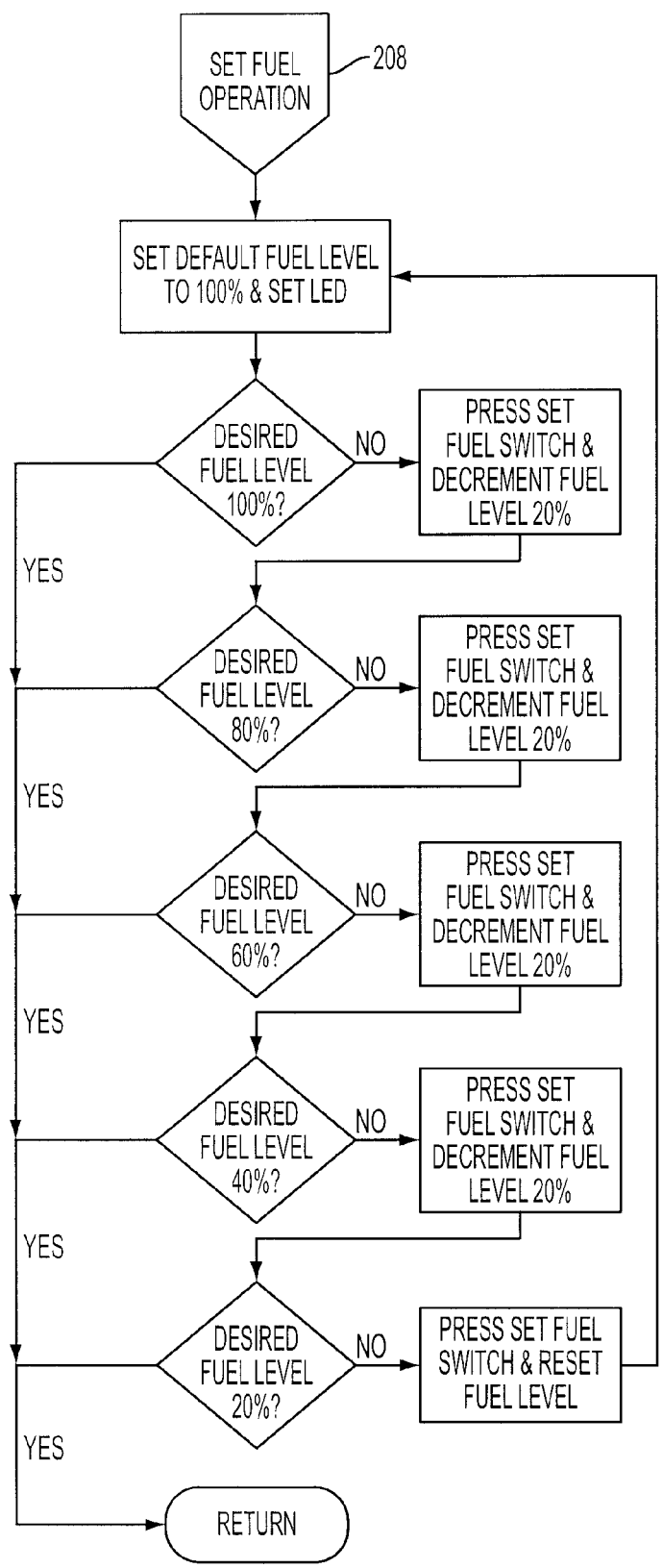
FIG. 3 is flow chart for the operation of setting the fuel level.

In one embodiment, as shown in FIG. 3, the step of setting the fuel level 208 comprises determining whether the desired set fuel level is 100%, 80%, 60%, 40%, or 20% and, in response to this determination, starting at a default set fuel level of 100% and, if the desired set fuel level is less than 100%, pressing the SET FUEL switch to decrease the default set fuel level in 20% increments until the desired set fuel level is reached, wherein, when the set fuel level is at 20% and the SET FUEL switch is pressed once more, the set fuel level returns to 100%. The 20% increments reflect the fuel level of one full measured syringe from the manual process, which can still be used as a back-up fueling system. This is the preferred embodiment, however, other set fuel levels are contemplated by the invention, for example 10% or 5%.

Figure 4:
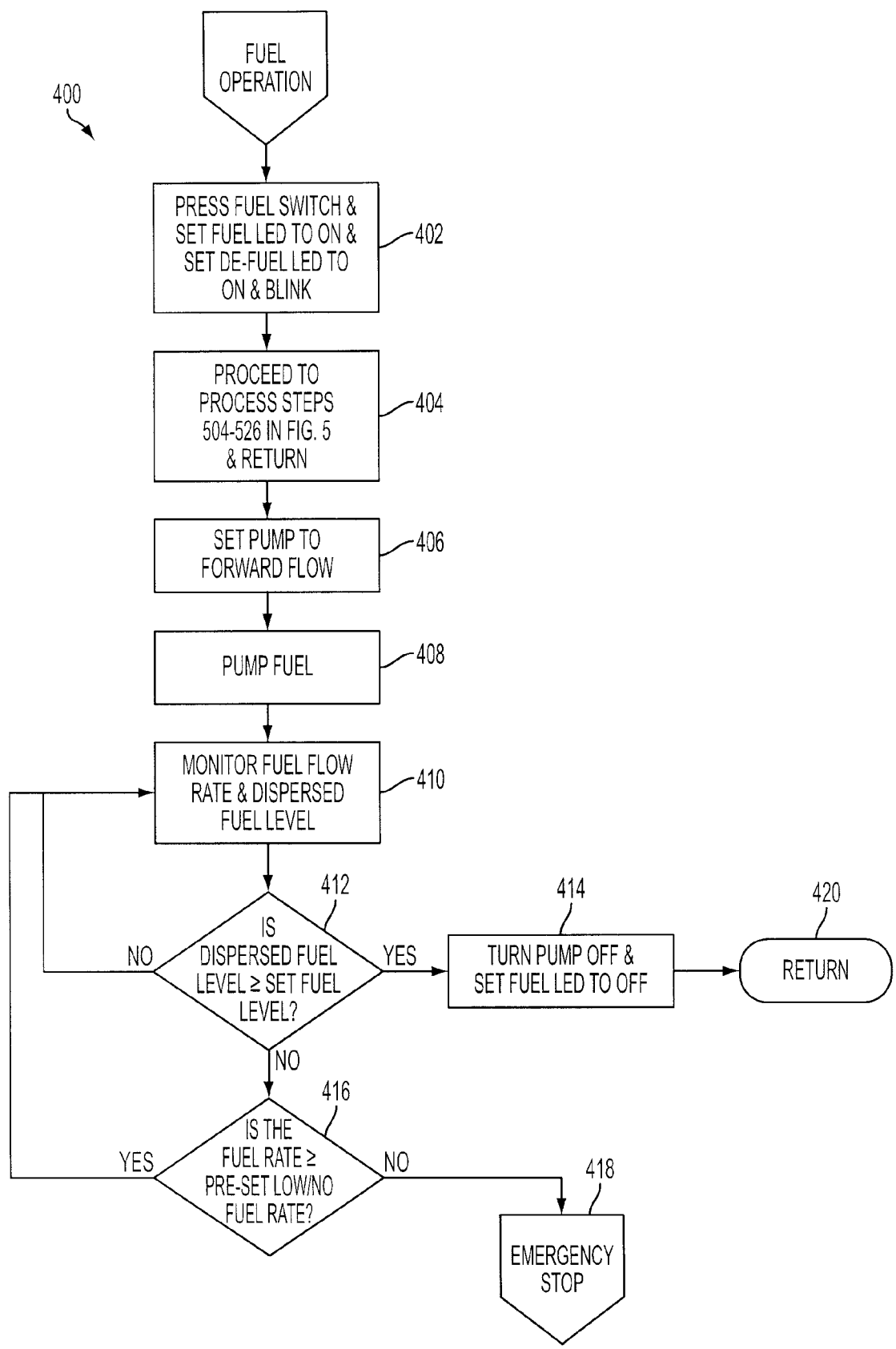
FIG. 4 is a flow chart for the fuel operation.
Figure 5:
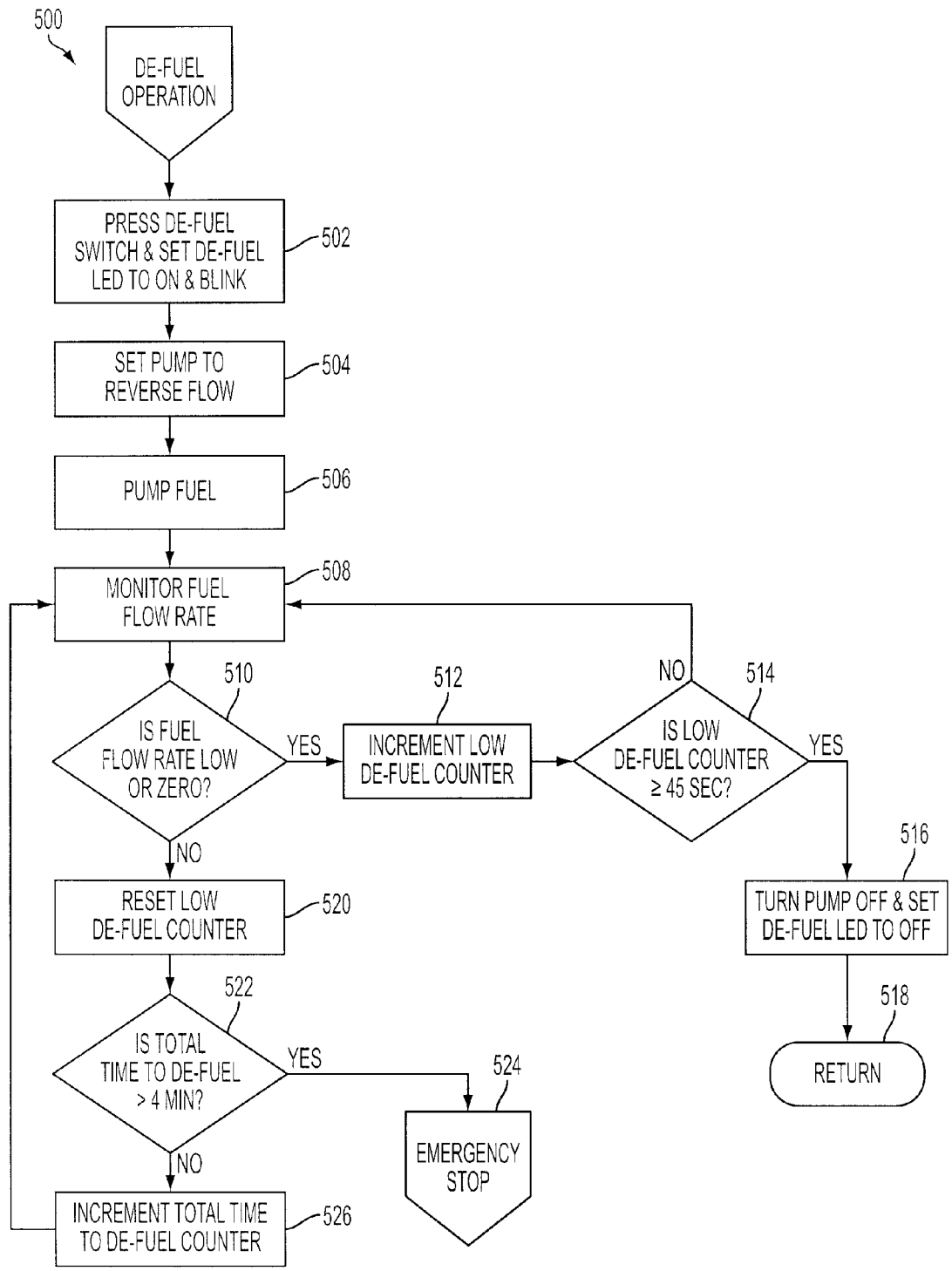
FIG. 5 is a flow chart for the de-fuel operation.

In one embodiment, as shown in FIGS. 4 and 5, the steps of de-fueling 500 and fueling 400 the unmanned aerial vehicle 12 comprise: (1) pressing the FUEL switch 402, (2) setting the DE-FUEL and FUEL light emitting diodes to ON 402, (3) setting the fuel pump to a reverse flow mode 404, 504, (4) pumping fuel from the unmanned aerial vehicle into the fuel canister 404, 506, (5) monitoring fuel flow rate and time at the flow meter to verify whether the fuel flow rate is low or zero 404, 508, (6a) if the fuel flow rate is low or zero 404, 510, then incrementing a low de-fuel counter to determine whether the low de-fuel counter is greater than or equal to 45 seconds 404, 512, then if the low de-fuel counter is less than 45 seconds 404, 514, returning to the step of monitoring fuel flow rate and time at the flow meter 404, 508 to verify whether the fuel flow rate is low or zero, otherwise, if the low de-fuel counter is greater than or equal to 45 seconds 404, 514, then setting the DE-FUEL light emitting diode to OFF 404, 516 and proceeding to a step of setting the fuel pump to a forward flow mode 406, 518, (6b) if the fuel flow rate is not low or zero 510, then resetting the counter 520 and determining whether the total time to de-fuel is greater than 4 minutes 522, if the total time is greater than 4 minutes 522, then activating an emergency stop 524, otherwise, if the total time to de-fuel is less than or equal to 4 minutes 522, then incrementing total time 526 and returning to the step of monitoring fuel flow rate and time at the flow meter 508 to verify whether the fuel flow rate is low or zero, (7) setting the fuel pump to a forward flow mode 406, (8) pumping fuel from the fuel canister to the unmanned aerial vehicle 408, (9) monitoring fuel flow rate and dispersed fuel level at the flow meter 410 to verify whether the dispersed fuel level is at the set fuel level, and (10a) if the dispersed fuel level is greater than or equal to the set fuel level 412, then setting the FUEL light emitting diode to OFF 414, (10b) if the dispersed fuel level is less than the set fuel level 412, then determining whether the fuel flow rate is greater than or equal to a pre-set low/no fuel flow rate 416, and if the fuel flow rate is greater than or equal to the pre-set low/no fuel flow rate 416, then returning to the step of monitoring fuel flow rate and dispersed fuel level at the flow meter 410 to verify whether the dispersed fuel level is at the set fuel level, otherwise, if the fuel flow rate is less than the pre-set low/no fuel flow rate 416, activating an emergency stop 418.

As used herein, pressing the FUEL switch 36 to activate the fuel operation 400 causes both the DE-FUEL and FUEL LEDs 46, 44 to turn on because both de-fueling and refueling are required by the fuel operation 400. As described above, for the fuel operation 400, the FUEL LED 44 is on and the DE-FUEL LED 46 blinks 402, indicating that de-fueling is occurring. Upon completion of the de-fuel operation 500, the DE-FUEL LED 46 is off 516 and the FUEL LED 44 blinks. Upon completion of the fuel operation 400, the FUEL LED 44 is turned off 414.

As used herein, the pump 28 is set to a reverse flow mode 504 in order to evacuate substantially all the fuel and air from the unmanned aerial vehicle's fuel tank into the fuel canister 26.

As used herein, monitoring fuel flow and time at the flow meter to verify whether the fuel flow rate is low or zero 510 is necessary to determine whether substantially all the fuel and air has been evacuated from the unmanned aerial vehicle's fuel tank. For example, if the fuel flow rate is not low or zero, that is an indication that fuel is still being drained from the fuel tank. Alternatively, the fuel flow rate may register as low or zero when air bubbles pass through the flow meter or as the fuel level in the fuel tank begins to dissipate. A fuel flow rate that registers as low or zero for a period of preferably forty-five seconds indicates that substantially all air and fuel has been purged from the system.

The fueling system 10 cyclically monitors for a low or zero flow reading 508 via a processor contained by the controller circuit card assembly 20. If the fuel flow rate is low or zero, a low de-fuel counter is incremented 512 to track the number of seconds that a continuous low or zero flow reading lasts. If a continuous flow reading of low or zero is greater than or equal to forty-five seconds 514, the de-fuel operation was successfully completed and the DE-FUEL LED is turned off 516. The pump 28 is then set to a forward flow mode 406 to begin refueling. If, however, a continuous flow reading of low or zero is less than forty-five seconds 514, then the system is not done de-fueling and the fueling system returns to the cyclical monitoring step 508.

When the fuel flow rate is not low or zero in the first instance 510, then the low de-fuel counter is reset 520 and a total de-fuel time counter (that begins counting the moment the FUEL switch is pressed) contained within the processor on the controller circuit card assembly 20 is consulted 526 to determine whether the total time to de-fuel is longer than four minutes 522. The total time the de-fuel operation should take is less than or equal to four minutes. If total time to de-fuel is greater than four minutes 522, then an emergency stop is activated 524, because there is likely a leak in the fuel system. If the total time to de-fuel is less than or equal to four minutes 522, then the total de-fuel time counter keeps timing the de-fuel operation 526 and the system continues to monitor fuel flow and time at the flow meter 508 to verify whether the fuel flow rate is low or zero. Once the fuel flow rate is measured to be low or zero for greater than or equal to forty-five seconds 514, the forward flow mode is activated 406 and the fuel operation begins.

During the fuel operation 400, the flow meter 24 measures the fuel flow rate and dispersed fuel level from the fuel canister 26 and outputs this data to the processor on the control circuit card assembly 20, which continuously compares that data to the default set fuel level or the set fuel level input by the user and to a pre-set low/no fuel flow rate. As used herein, the dispersed fuel level is the total amount of fuel contained in the unmanned aerial vehicle and the pre-set low/no fuel flow rate indicates that the fuel canister 26 does not contain enough fuel to complete the refuel to up to the set fuel level. When the dispersed fuel level is less than the set fuel level 412 and the processor determines that the fuel flow rate is greater than or equal to the pre-set low/no fuel flow rate 416, the fueling system 10 continues to monitor the fuel flow rate and dispersed fuel level 410. When the dispersed fuel level is greater than or equal to the set fuel level 412, then the FUEL LED is turned off 414 and the fuel operation is completed 420. On the other hand, if the dispersed fuel level is less than the set fuel level 412 and the processor determines that the fuel flow rate is less than the pre-set low/no fuel flow rate 416, the fueling system activates an emergency stop 418.

Figure 6:
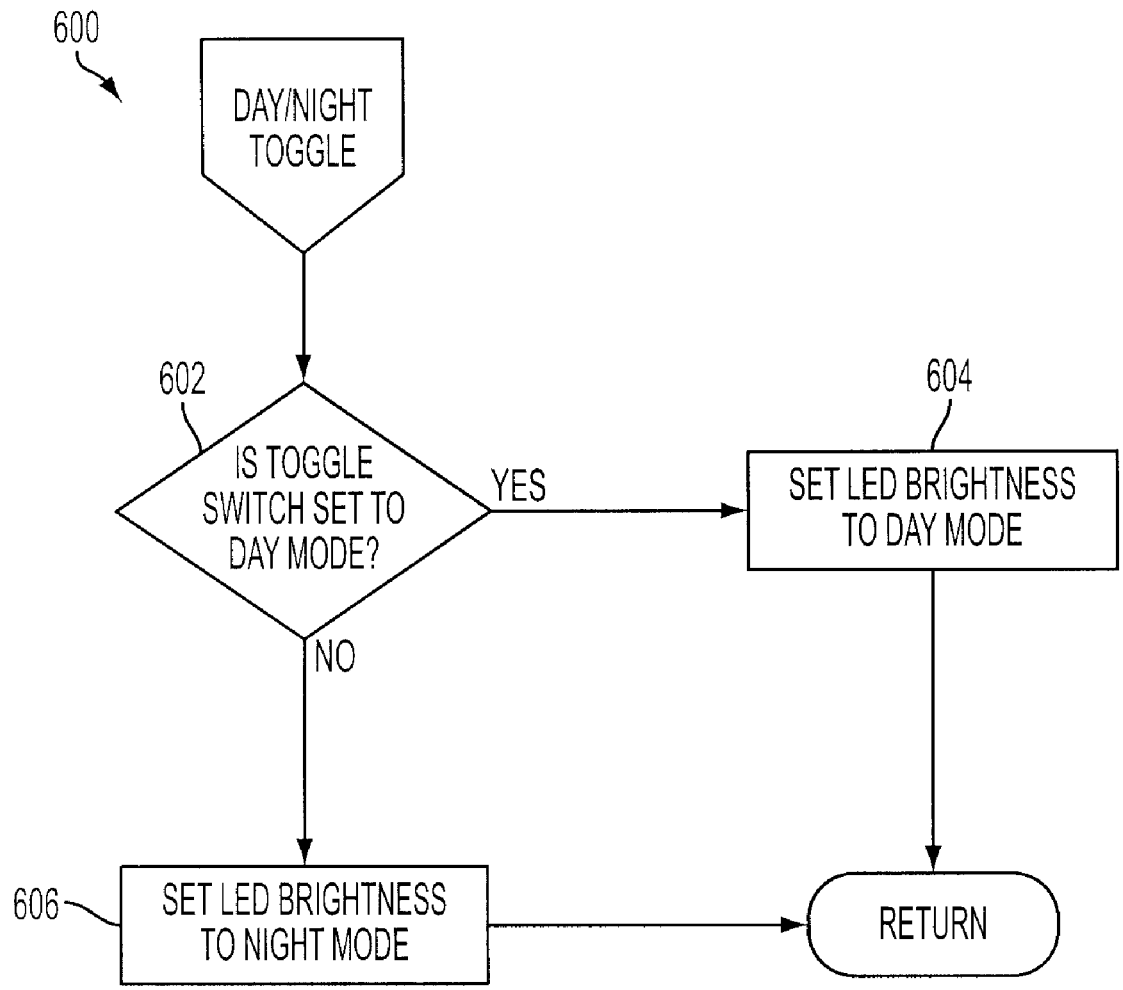
FIG. 6 is a flow chart for the DAY/NIGHT toggle operation.
Figure 7:
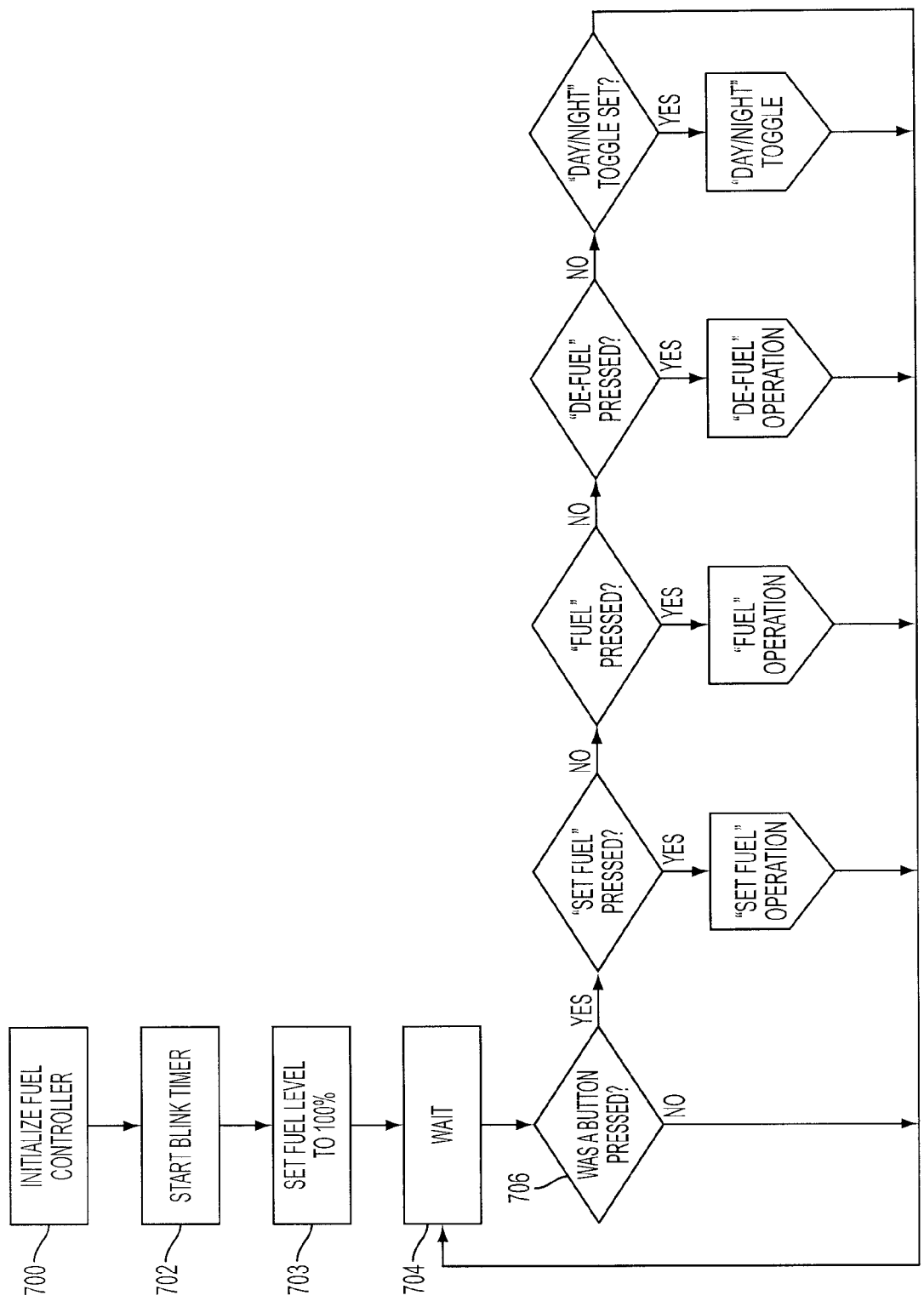
FIG. 7 is flow chart for the operation of initializing the controller circuit card assembly.

In one embodiment the method may further comprise, after the step of applying power 206, the step of toggling between a DAY mode and a NIGHT mode 600, as shown in FIG. 6, by pressing the DAY/NIGHT toggle switch 40, wherein toggling between a DAY mode and a NIGHT mode 600 comprises determining whether the switch is set to DAY mode 602, and, if the switch is set to DAY mode, setting the brightness of the light emitting diodes to DAY mode 604, and, if the switch is not set to DAY mode, setting the brightness of the light emitting diodes to NIGHT mode 606.

In one embodiment the method may further comprise, after the step of toggling between a DAY mode and a NIGHT mode 600, the step of initializing the controller circuit card assembly 20, 700 that comprises the steps of starting a blink timer 702, setting the fuel level to 100% 703, waiting for a predetermined amount of time set on the blink timer 704, and querying whether the SET FUEL 34, DE-FUEL 38, FUEL 36, or DAY/NIGHT toggle switch 40 is pressed 706, then if the one of the switches is pressed, performing the associated operation, otherwise returning to the step of waiting for a predetermined amount of time set on the blink timer 706.

As used herein, a blink timer toggles any blinking LEDs on and off at a frequency of 2 Hz to indicate to the operator that a particular operation is being performed. Similarly, when an emergency stop condition is activated, the plurality of LEDs blink 22 at a preferred frequency of about 5 Hz to alert the operator that there is an emergency stop condition.

In one embodiment, the plurality of light emitting diodes 22 includes a ten segment array of light emitting diodes to indicate FUEL LEVEL 42, a light emitting diode to indicate whether the FUEL switch is activated 44, a light emitting diode to indicate whether the DE-FUEL switch is activated 46, and a 3 segment array of light emitting diodes to indicate battery level 48, and wherein the DE-FUEL or FUEL light emitting diodes 46, 44 each blink in response to input from the blink timer while the system 10 is de-fueling or fueling, respectively, during normal operation.

In one embodiment, the plurality of light emitting diodes 22 blink at a faster rate than during normal operation in response to activation of the emergency stop. As stated above, in normal operation the appropriate LED blinks at approximately 1 Hz, and in response to an emergency stop, the plurality of LEDs 22 blink at a rate of 4 Hz.

In a third aspect, the present invention provides a method for de-fueling a ducted fan unmanned aerial vehicle 12 using an electric fueling system 10 that comprises: (a) equalizing static electricity 200 between the vehicle 12 and the ground, (b) attaching a first fuel line 54 from the electric fueling system 10 to a fuel canister 26, 202, wherein the electric fueling system 10 comprises (i) a control box 14 comprising a plurality of switches 16, a battery 18, a controller circuit card assembly 20, and a plurality of light emitting diodes 22, (ii) a flow meter 24 coupled to the control box 14 and to an unmanned aerial vehicle 12, (iii) a pump 28 coupled to the flow meter 24, to the control box 14, and to the fuel canister 26, and (iv) a housing 30 that contains the control box 14, flow meter 24, and pump 28, wherein the plurality of switches 16 include a SET FUEL switch 34, DE-FUEL switch 38, FUEL switch 36, and DAY/NIGHT toggle switch 40, (c) attaching a second fuel line 32 from the electric fueling system 10 to the unmanned aerial vehicle 12, 204, (d) applying power to the electric fueling system 206, (e) de-fueling the unmanned aerial vehicle 210, 500, and (f) in response to a stop condition being indicated on one of the plurality of light emitting diodes 22, disconnecting the electric fueling system 10 from the unmanned aerial vehicle 12 and from the fuel canister 26, 214.

In one embodiment, the step of de-fueling 500 the unmanned aerial vehicle 12 comprises: (1) pressing the DE-FUEL switch 502, (2) setting the DE-FUEL light emitting diode to ON 502, (3) setting the fuel pump 28 to a reverse flow mode 504, (4) pumping fuel from the unmanned aerial vehicle 12 into the fuel canister 26, 506, (5) monitoring fuel flow rate and time at the flow meter to verify whether the fuel flow is low or zero 508, and (6a) if the fuel flow rate is low or zero 510, incrementing a low de-fuel counter to determine whether the low de-fuel counter is greater than 45 seconds 512, then if the low de-fuel counter is less than 45 seconds 514, then returning to the step of monitoring fuel flow rate and time at the flow meter 508 to verify whether the fuel flow rate is low or zero, otherwise, if the low de-fuel counter is greater than or equal to 45 seconds 514, then setting the DE-FUEL light emitting diode to OFF 516, (6b) if the fuel flow rate is not low or zero 510, then resetting the counter 520 and determining whether the total time to de-fuel is greater than 4 minutes 522, then if the total time to de-fuel is greater than 4 minutes 522, activating an emergency stop 524, otherwise, if the total time to de-fuel is less than or equal to 4 minutes 522, then incrementing total time to de-fuel 526 and returning to the step of monitoring fuel flow rate and time at the flow meter 508 to verify whether the fuel flow rate is low or zero.

As used herein, pressing the DE-FUEL switch 38 to activate the de-fuel operation 500 causes only the DE-FUEL LED 46 to turn on and blink and the LED 46 turns off upon completion of the de-fuel operation 500.

In one embodiment, the method may further comprise, after the step of applying power 206, the step of toggling between a DAY mode and a NIGHT mode 600 by pressing the DAY/NIGHT toggle switch 40, wherein toggling between a DAY mode and a NIGHT mode 600 comprises determining whether the switch is set to DAY mode 602, and, if the switch is set to DAY mode, setting the brightness of the light emitting diodes to DAY mode 604, and, if the switch is not set to DAY mode, setting the brightness of the light emitting diodes to NIGHT mode 606.

In one embodiment, the method may further comprise, after the step of toggling between a DAY mode and a NIGHT mode 600, the step of initializing the controller circuit card assembly 20, 700 that comprises the steps of starting a blink timer 702, setting the fuel level to 100% 703, waiting for a predetermined amount of time set on the blink timer 704, and querying whether the SET FUEL 34, DE-FUEL 38, FUEL 36, or DAY/NIGHT toggle switch 40 is pressed 706, then if the one of the switches is pressed, performing the associated operation, otherwise returning to the step of waiting for a predetermined amount of time set on the blink timer 706.

In one embodiment, the plurality of light emitting diodes 22 includes a ten segment array of light emitting diodes to indicate FUEL LEVEL 42, a light emitting diode to indicate whether the FUEL switch is activated 44, a light emitting diode to indicate whether the DE-FUEL switch is activated 46, and a 3 segment array of light emitting diodes to indicate battery level 48, and wherein the DE-FUEL light emitting diode 46 blinks in response to input from the blink timer while the system 10 is de-fueling during normal operation.

In one embodiment, the plurality of light emitting diodes 22 blink at a faster rate than during normal operation in response to activation of the emergency stop.

The invention claimed is:

1. An electric fueling system for a vehicle, the electric fueling system comprising:
a fuel canister;
a control box comprising:
a plurality of switches, wherein at least one of the switches of the plurality of switches is configured to receive user input indicating a desired fuel level of the vehicle,
a battery,
a controller circuit card assembly configured to receive user input via the plurality of switches, and
a plurality of light emitting diodes, wherein the controller circuit card is configured to provide an output to the plurality of light emitting diodes;
a flow meter coupled to the control box and to the vehicle, wherein the flow meter is configured to measure an amount of fuel delivered to the vehicle;
a pump coupled to the flow meter, to the control box, and to the fuel canister, wherein the pump is configured to de-fuel and refuel the vehicle; and
a housing that contains the control box, the flow meter, and the pump,
wherein the controller circuit card assembly is configured to control fueling and de-fueling of the vehicle based on the user input and input from the flow meter, and provide an output to the pump.

2. An electric fueling system as claimed in claim 1, wherein the plurality of switches includes a SET FUEL switch that is configured to receive user input indicating a fuel level dispensed into the vehicle, a FUEL switch that is configured to receive user input that activates a fuel operation comprising at least one of a refuel operation or a de-fuel operation, a DE-FUEL switch that is configured to receive user input that activates the de-fuel operation, and a DAY/NIGHT toggle switch that is configured to control a brightness associated with at least one light emitting diode of the plurality of light emitting diodes.

3. An electric fueling system as claimed in claim 2, wherein the plurality of light emitting diodes includes a ten segment array of light emitting diodes to indicate a fuel level, a light emitting diode to indicate whether the FUEL switch is activated, a light emitting diode to indicate whether the DE-FUEL switch is activated, and a 3 segment array of light emitting diodes to indicate a battery level of the battery.

4. An electric fueling system as claimed in claim 3, wherein the controller circuit card assembly comprises control logic configured to manage a plurality of functions including setting the fuel level, de-fueling the vehicle, fueling the vehicle, and changing a brightness associated with the at least one light emitting diode of the plurality of light emitting diodes, wherein the control logic is configured to receive one or more inputs from at least one of the plurality of switches, the flow meter, the battery, and the pump, and provide one or more outputs to the plurality of light emitting diodes and the pump based on the one or more inputs.

5. An electric fueling system as claimed in claim 1, further comprising:
a filter placed inline between the pump and the fuel canister; and a header tank placed inline between the flow meter and the vehicle.

6. An electric fueling system as claimed in claim 1, further comprising the vehicle, wherein the vehicle is an unmanned aerial vehicle.

7. A method for fueling a ducted fan unmanned aerial vehicle using an electric fueling system, the method comprising:
  equalizing static electricity between the unmannned aerial vehicle and the ground;
  attaching a first fuel line from the electric fueling system to a fuel canister, wherein the electric fueling system comprises (a) a control box comprising a plurality of switches, a battery, a controller circuit card assembly, and a plurality of light emitting diodes, (b) a flow meter coupled to the control box and to the unmanned aerial vehicle, (c) a pump coupled to the flow meter, to the control box, and to the fuel canister, and (d) a housing that contains the control box, flow meter, and pump, wherein the plurality of switches include a SET FUEL switch, DE-FUEL switch, FUEL switch, and DAY/NIGHT toggle switch;
  attaching a second fuel line from the electric fueling system to the unmanned aerial vehicle;
  applying power to the electric fueling system;
  setting the fuel level, if necessary, via a SET FUEL switch;
  de-fueling the unmanned aerial vehicle;
  fueling the unmanned aerial vehicle; and
  in response to a stop condition being indicated on one of the plurality of light emitting diodes, disconnecting the electric fueling system from the unmanned aerial vehicle and from the fuel canister.

8. The method of claim 7, wherein setting the fuel level comprises the steps of:
  determining whether the desired set fuel level is 100%, 80%, 60%, 40%, or 20%; and
  in response to this determination, starting at a default set fuel level of 100% and, if the desired set fuel level is less than 100%, pressing the SET FUEL switch to decrease the default set fuel level in 20% increments until the desired set fuel level is reached, wherein, when the set fuel level is at 20% and the SET FUEL switch is pressed once more, the set fuel level returns to 100%.

9. The method of claim 8, wherein de-fueling and fueling the unmanned aerial vehicle comprises the steps of:
  pressing the FUEL switch;
  setting the DE-FUEL and FUEL light emitting diodes to ON;
  setting the fuel pump to a reverse flow mode;
  pumping fuel from the unmanned aerial vehicle into the fuel canister;
  monitoring fuel flow rate and time at the flow meter to verify whether the fuel flow rate is low or zero;
  if the fuel flow rate is low or zero, incrementing a low de-fuel counter to determine whether the low de-fuel counter is greater than or equal to 45 seconds;
    if the low de-fuel counter is less than 45 seconds, returning to the step of monitoring fuel flow rate and time at the flow meter to verify whether the fuel flow rate is low or zero;
    if the low de-fuel counter is greater than or equal to 45 seconds, setting the DE-FUEL light emitting diode to OFF and proceeding to a step of setting the fuel pump to a forward flow mode;
  if the fuel flow rate is not low or zero, resetting the counter and determining whether the total time is greater than 4 minutes;
    if the total time to de-fuel is greater than 4 minutes, activating an emergency stop;
    if the total time to de-fuel is less than or equal to 4 minutes, incrementing total time and returning to the step of monitoring fuel flow rate and time at the flow meter to verify whether the fuel flow rate is low or zero;
  setting the fuel pump to a forward flow mode;
  pumping fuel from the fuel canister to the unmanned aerial vehicle;
  monitoring fuel flow rate and dispersed fuel level at the flow meter to verify whether the dispersed fuel level is at the set fuel level; and
  if the dispersed fuel level is greater than or equal to the set fuel level, setting the FUEL light emitting diode to OFF;
  if the dispersed fuel level is less than the set fuel level, determining whether the fuel flow rate is greater than or equal to a pre-set low/no fuel rate;
    if the fuel flow rate is greater than or equal to the pre-set low/no fuel flow rate, returning to the step of monitoring fuel flow rate and dispersed fuel level at the flow meter to verify whether the dispersed fuel level is at the set fuel level;
    if the fuel flow rate is less than the pre-set low/no fuel flow rate, activating an emergency stop.

10. The method of claim 9, further comprising:
  after the step of applying power, toggling between a DAY mode and a NIGHT mode by pressing the DAY/NIGHT toggle switch, wherein toggling between a DAY mode and a NIGHT mode comprises determining whether the switch is set to DAY mode, and, if the switch is set to DAY mode, setting the brightness of the light emitting diodes to DAY mode, and, if the switch is not set to DAY mode, setting the brightness of the light emitting diodes to NIGHT mode.

11. The method of claim 10, further comprising:
  after the step of toggling between a DAY mode and a NIGHT mode, initializing the controller circuit card assembly that comprises the steps of starting a blink timer, setting the fuel level to 100%, waiting for a predetermined amount of time set on the blink timer, and querying whether the SET FUEL, DE-FUEL, FUEL, or DAY/NIGHT toggle switch is pressed, then if one of the switches is pressed, performing the associated operation, otherwise returning to the step of waiting for a predetermined amount of time set on the blink timer.

12. The method of claim 11, wherein the plurality of light emitting diodes includes a ten segment array of light emitting diodes to indicate FUEL LEVEL, a light emitting diode to indicate whether the FUEL switch is activated, a light emitting diode to indicate whether the DE-FUEL switch is activated, and a 3 segment array of light emitting diodes to indicate battery level, and wherein the DE-FUEL or FUEL light emitting diodes each blink in response to input from the blink timer while the system is de-fueling or fueling, respectively, during normal operation.

13. The method of claim 12, wherein the plurality of light emitting diodes blink at a faster rate than during normal operation in response to activation of the emergency stop.

14. A method for de-fueling a ducted fan unmanned aerial vehicle using an electric fueling system, the method comprising:
  equalizing static electricity between the unmanned aerial vehicle and the ground;
  attaching a first fuel line from the electric fueling system to a fuel canister, wherein the electric fueling system comprises (a) a control box comprising a plurality of switches, a battery, a controller circuit card assembly, and a plurality of light emitting diodes, (b) a flow meter coupled to the control box and to the unmanned aerial vehicle, (c) a pump coupled to the flow meter, to the control box, and to the fuel canister, and (d) a housing that contains the control box, flow meter, and pump, wherein the plurality of switches include a SET FUEL switch, DE-FUEL switch, FUEL switch, and DAY/NIGHT toggle switch;

attaching a second fuel line from the electric fueling system to the unmanned aerial vehicle;

applying power to the electric fueling system;

de-fueling the unmanned aerial vehicle; and in response to a stop condition being indicated on one of the plurality of the light emitting diodes, disconnecting the electric fueling system from the unmanned aerial vehicle and from the fuel canister.

15. The method of claim 14, wherein de-fueling the unmanned aerial vehicle comprises the steps of:

pressing the DE-FUEL switch;

setting the DE-FUEL light emitting diode to ON;

setting the fuel pump to a reverse flow mode;

pumping fuel from the unmanned aerial vehicle into the fuel canister;

monitoring fuel flow rate and time at the flow meter to verify whether the fuel flow rate is low or zero; and if the fuel flow rate is low or zero, incrementing a low de-fuel counter to determine whether the low de-fuel counter is greater than or equal to 45 seconds;

if the low de-fuel counter is less than 45 seconds, returning to the step of monitoring fuel flow rate and time at the flow meter to verify whether the fuel flow rate is low or zero;

if the low de-fuel counter is greater than or equal to 45 seconds, setting the DE-FUEL light emitting diode to OFF;

if the fuel flow rate is not low or zero, resetting the counter and determining whether the total time to de-fuel is greater than 4 minutes;

if the total time to de-fuel is greater than 4 minutes, activating an emergency stop;

if the total time to de-fuel is less than or equal to 4 minutes, incrementing total time to de-fuel and returning to the step of monitoring fuel flow rate and time at the flow meter to verify whether the fuel flow rate is low or zero.

16. The method of claim 15, further comprising:

after the step of applying power, toggling between a DAY mode and a NIGHT mode by pressing the DAY/NIGHT toggle switch, wherein toggling between a DAY mode and a NIGHT mode comprises determining whether the switch is set to DAY mode, and, if the switch is set to DAY mode, setting the brightness of the light emitting diodes to DAY mode, and, if the switch is not set to DAY mode, setting the brightness of the light emitting diodes to NIGHT mode.

17. The method of claim 16, further comprising:

after the step of toggling between a DAY mode and a NIGHT mode, initializing the controller circuit card assembly that comprises the steps of starting a blink timer, setting the fuel level to 100%, waiting for a predetermined amount of time set on the blink timer, and querying whether the SET FUEL, DE-FUEL, FUEL, or DAY/NIGHT toggle switch is pressed, then if the one of the switches is pressed, performing the associated operation, otherwise returning to the step of waiting for a predetermined amount of time set on the blink timer.

18. The method of claim 17, wherein the plurality of light emitting diodes includes a ten segment array of light emitting diodes to indicate FUEL LEVEL, a light emitting diode to indicate whether the FUEL switch is activated, a light emitting diode to indicate whether the DE-FUEL switch is activated, and a 3 segment array of light emitting diodes to indicate battery level, and wherein the DE-FUEL light emitting diode blinks in response to input from the blink timer while the system is de-fueling during normal operation.

19. The method of claim 18, wherein the plurality of light emitting diodes blink at a faster rate than during normal operation in response to activation of the emergency stop.

* * * * *